US005586137A

United States Patent [19]

Pappas et al.

[11] Patent Number: 5,586,137

[45] Date of Patent: Dec. 17, 1996

[54] COMPACT HIGH EFFICIENCY ELECTRICAL POWER SOURCE

[75] Inventors: Daniel S. Pappas; Gene H. McCall; George W. York, all of Los Alamos, N.M.

[73] Assignee: ADVEC Corp., Los Alamos, N.M.

[21] Appl. No.: 582,457

[22] Filed: Jan. 3, 1996

[51] Int. Cl.$^6$ .......... H01S 3/09

[52] U.S. Cl. .......... 372/73; 372/69; 372/34; 376/122; 376/147; 376/326

[58] Field of Search .......... 372/73, 34, 69–72; 376/146, 147, 122, 133, 326

[56] References Cited

U.S. PATENT DOCUMENTS

| | | | |
|---|---|---|---|
| 4,091,336 | 5/1978 | Miley et al. | 331/94.5 P |
| 4,160,956 | 7/1979 | Fader | 331/94.5 P |
| 4,398,294 | 8/1983 | Miller et al. | 372/70 |
| 4,800,566 | 1/1989 | Pappas | 372/73 |
| 4,835,787 | 5/1989 | Pappas | 372/73 |

*Primary Examiner*—Leon Scott, Jr.

[57] ABSTRACT

A compact fission reactor generates a flux of fission fragments, fission neutrons, and gamma-ray photons. The flux excites a noble element converter medium which produces light. Optical means are provided for focusing the light onto an array of photovoltaic cells. The photovoltaic cells convert the light radiation into electrical energy for various load applications.

13 Claims, 4 Drawing Sheets

COMPACT HIGH EFFICIENCY ELECTRICAL POWER SOURCE

BACKGROUND OF THE INVENTION

This invention relates to fission reactor pumped electrical sources and, more particularly, to nuclear pumped light sources which utilize photovoltaic cells for the conversion of fission energy to electrical energy.

It is known to pump laser media using fission products produced by nuclear fission reactions. The fission products interact with an intermediate material to produce energetic particles which thereafter excite a fluid media to obtain a population inversion which produces a light output. Similarly, it is known to produce light by utilization of high energy fission products for light production.

By way of example, the following U.S. patents, incorporated herein by reference, teach various fusion and fission pumped light sources and lasers:

1. Daniel S. Pappas, "Fusion Pumped Light Source," U.S. Pat. No. 4,835,787, dated May 30, 1989, provides a long pulse high energy (14 MeV) neutron source, a fusion reactor, to generate light in a pre-selected lasing medium. The laser medium includes a first component liquid selected from Group VIII of the periodic table of the elements (i.e., a noble "gas": He, Ne, Ar, Kr, Xe, or Rn)
2. Daniel S. Pappas, "Fusion Pumped Laser," U.S. Pat. No. 4,800,566, dated Jan. 24, 1989, provides a long or continuous pulse of neutrons from a Tokamak device. A conversion medium receives neutrons from the Tokamak and converts the high energy neutrons to an energy source with an intensity and energy effective to excite a pre-selected lasing medium. Such lasing medium is selected to support laser oscillations for generating output radiation.
3. Walter J. Fader, "Nuclear-Pumped Uranyl Salt Laser," U.S. Pat. No. 4,160,956, dated Jul. 10, 1979, provides a $UO_2^{++}$ uranyl salt laser medium enriched with a $^{235}U$ fission source. Fission products are produced within the uranyl salt to interact with the $UO_2^{++}$ ion to produce a lasing output from the uranyl salt.
4. George H. Miley et al., "Direct Nuclear Pumped Laser," U.S. Pat. No. 4,091,336, dated May 23, 1978, provides a neutron source, a nuclear reactor, to irradiate a cylinder coated with $^{235}U$ or $^{10}B$ and containing a laser medium of $Ne\text{-}N_2$.
5. Thomas G. Miller et al., "High Power Nuclear Photon Pumped Laser," U.S. Pat. No. 4,398,294, dated Aug. 9, 1983, provides a pulsed nuclear reactor for generating neutrons to produce gamma and x-ray energy through inelastic scattering with iron. The output energy then excites Xe to generate photons which are effective to excite a laser medium of Ar, $SF_6$, and $XeF_2$.

The prior art fission or fusion sources are intended to produce a laser output only. These nuclear sources are intended to excite a laser medium using singly either fission fragments, fission neutrons, or fusion neutrons. The prior art does not simultaneously utilize fission fragments, fission neutrons, as well as prompt fission gamma-ray photons in concert to excite a light conversion medium. The term light conversion medium, in reference to the present invention, refers to a material which can be excited to obtain a population state inversion whereby photons are produced as the excited state decays to a lower state. The output light may be incoherent for use as a "flashlamp" or may be amplified to form a coherent, or lasing output. The production of light as both coherent and incoherent output from nuclear fission sources which utilize fission fragments only is described in M. A. Prelas et al., "Nuclear Driven Flashlamps," Lasers and Particle Beams Vol. 6, part 1. pp.26–62 (1988), incorporated herein by reference. The production of light as both coherent and incoherent output from nuclear fusion neutrons only is described in D. S. Pappas, "Physics of Fusion Pumped Lasers," Lasers and Particle Beams, Vol. 7, part 3. pp. 443–447 (1989), incorporated herein by reference. However, only a fraction of the available energy is used to generate light energy and electrical energy is not produced.

In accordance with the present invention, a fission source provides a combination of fission fragments, neutrons, and gamma rays which directly interact with a noble gas converter to obtain narrow bandwidth ultraviolet radiation. Therefore all of the fission products are utilized in the scheme herein proposed and a more efficient light source is provided.

Accordingly, it is the object of the present invention to provide a light source which can be efficient in generating electrical energy.

Another object is to convert fission energy to narrow band UV radiation.

Yet another object is to focus output UV radiation on an array of photovoltaic cells.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a system for generating light radiation in a pre-selected medium from a nuclear fission source. The fission fragments, neutrons, and gamma-ray photons produced by fission reactions in the core excite a liquid or gaseous noble element converter medium. The subsequent transition of the converter media atoms from the higher energy state to a lower energy state results in the production of photons which are either reflected and focused onto an array of photovoltaic cells strategically located external to the reactor/converter core region, or impinge through a transparent wall upon an array of photovoltaic cells arrayed around the medium. The photovoltaic cells are specifically chosen to have a band gap matched to the energy of the incident photons being produced in the rare gas converter media, thus making a carefully matched and highly efficient system. Furthermore, the invention results in a compact, mechanically robust, and cost effective power system.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1A:
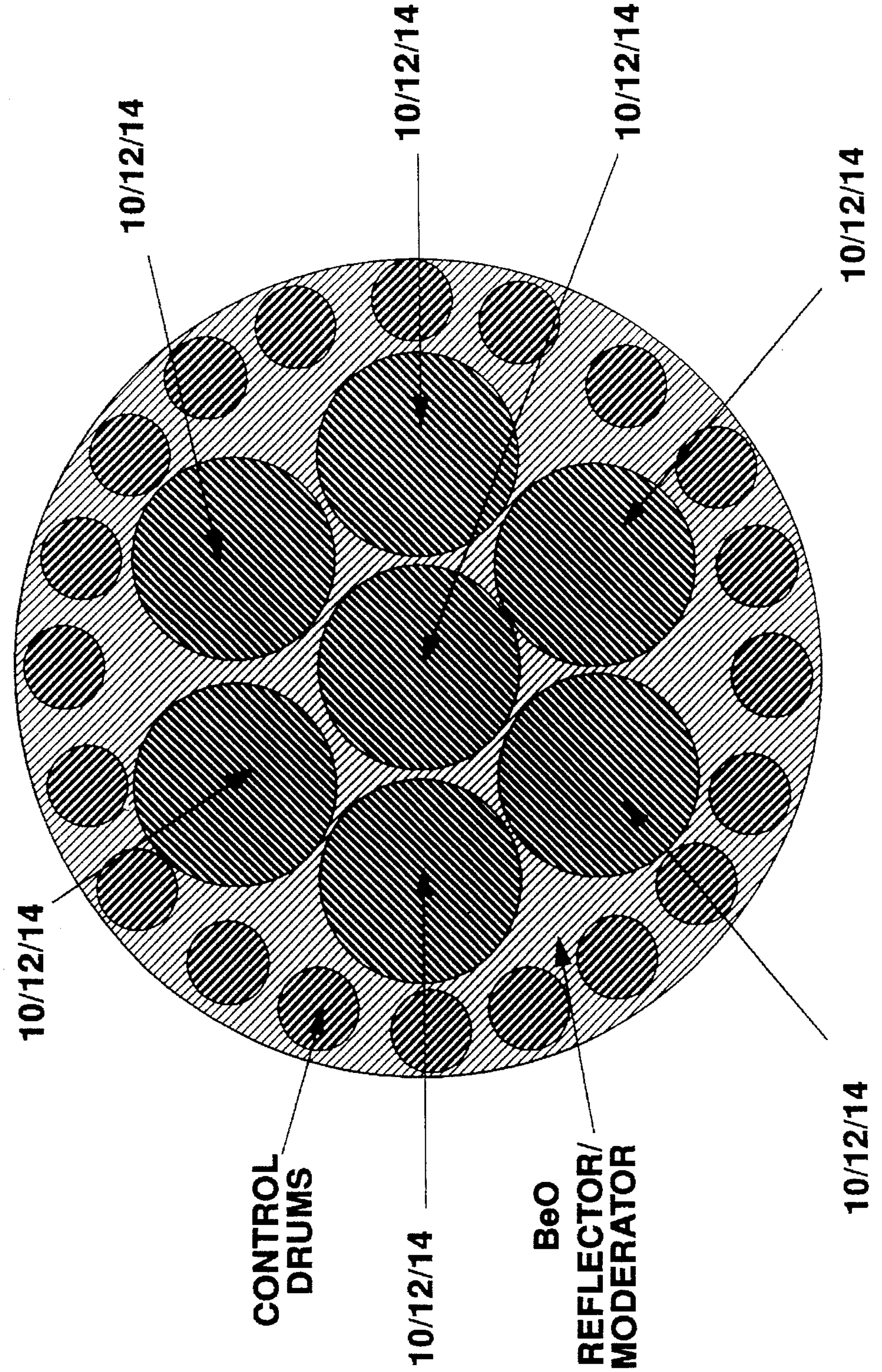
FIGS. 1A and 1B are representations, in cross section, of a compact fission driven electrical power source with an optical transmission tunnel and remote photovoltaic array.

As discussed in the prior art, a variety of media may be used to generate incoherent light output when excited by fission by-products. Table A is illustrative of gaseous or liquefied media which produce light outputs from excitation arising from interaction with fission fragments, neutrons, and gamma-ray photons.

TABLE A

ILLUSTRATIVE CONVERTER MEDIA

| Converter Medium | Radiation Emitted |
|---|---|
| Ar | UV |
| Kr | UV |
| Xe | UV |
| ArO | Visible |
| KrO | Visible |
| XeO | Visible |

In one embodiment of the present invention, a fission reactor is provided as a simultaneous source of fission neutrons, gamma-ray photons, and fission fragments. The fissile fuel in the reactor is in a volatile or soluble compound (e.g. $UF_6$) and is dissolved in a liquid or high density gaseous noble element conversion medium. The reactor generates neutron, prompt fission gamma rays, and fission fragments in a density effective to produce narrow bandwidth radiation. Optical means are provided for focusing (or directing) the radiation onto photovoltaic cells.

A nuclear fission reactor provides a steady neutron, fission fragment, and gamma-ray photon flux to fluoresce the conversion media. The flux of fission by-products on the converter media is increased or decreased by use of moderator and/or reflector materials external to the core region. One suitable set of reactor parameters is shown in Table B.

TABLE B

Reactor Specifications

1. Fuel Type ($UF_6$, 20% enrichment, in Ar gas)
2. Reflector (concentric annuli of Be and C, 40 cm and 20 cm thickness respectively)
3. Control System (cylindrical control rod(s) located in the reflector/moderator annuli)
4. Cooling System (heat exchanger with active pumping)
5. Core Parameters (length 150 cm, diameter 150 cm)
6. Core Containment (quartz annulus, ID=150 cm, OD=220 cm)
7. Operating Parameters (pressure 1200 psi, density 500 mg/cc @1200 psi)

A converter medium is selected from, e.g., the media listed in Table A, to obtain a large number of excitations due to interactions with the neutrons, gammas, and fission fragments produced in the fissioning plasma. A converter is provided which produces light radiation from the transition of converter atoms from excited to ground energy states. The converter atoms are excited by electrons produced by Compton scattering of gamma-ray photons. The photons result from (n,gamma) reactions in the converter media and directly from fission neutron-production events.

Additionally, the converter media is provided so as to be excited by fission fragments in the fuel. Because of the short distance these heavy particles can travel without losing their kinetic energy (on the order of millimeters), the atoms of the noble element converter are interspersed with the fissioning nuclei of the fuel. The preferred embodiment consists of $UF_6$ fuel dissolved in the noble element converter. In this embodiment, greater than 80% of the energy released per fission event is available to excite the atoms in the converter media since approximately 80% of the fission energy released is in the form of fission fragments. The remaining energy is released in the form of neutrons and prompt gamma radiation.

Our approach is to utilize a fluidized converter media with a density effective to obtain conversion of all of the fission by-products. In order to accomplish this, we utilize either liquefied noble gases at cryogenic temperatures (or at nearly room temperature at high pressures). A second option is to utilize very high pressure gas converter media at approximately 2000 psi. The careful choice of media type and density allows conversion not only of fission fragments to light energy but also conversion of the fission neutrons and fission gammas. This is true due to the fact that the cross section for inelastic scattering of neutrons is high (approximately 1 barn) at low neutron energies and that the density of the converter media is high in the liquid or high pressure gas regime chosen (2000 psi).

Therefore, whereas only as much as 160 MeV/200 MeV conversion was achievable in the earlier technology which converted only fission fragments alone, or in other approaches where only fission neutrons in heavy metal converters resulting in production of gammas or in conversion of fission neutrons alone, in the embodiment herein described, nearly 100% of the energy released per fission is available for conversion to light energy.

A transmission method is selected to obtain a high percentage of UV radiation produced in the conversion media incident upon the photovoltaic cells. In the embodiment herein described, two transmission methods are preferred. The converter media are optically thick to UV light. However, the absorption of UV photons is followed by re-emission with virtually no loss. Thus, the UV is absorbed and re-emitted many times until a boundary is reached and the output light reaches either the photovoltaic cells as in Claim 13 or the light transmission apparatus as in Claim 12.

In a first embodiment, the optical radiation produced in the converter media is channeled to photocells located exterior to both the reactor and shield. Highly reflective surfaces, e.g. Aluminum, coated with a 10 micron thick layer of $MgF_2$ (to enhance the reflectivity and provide protection to the Aluminum), focus the UV radiation onto photocells located exterior to the core without allowing a path for radiation streaming. The reflective surfaces deflect the UV light into transmission tunnels normal to the longitudinal axis of the core/converter region. The reflective surfaces are positioned directly in the path of $UF_6$ - Ar flow and are designed to provide a pathway for the gaseous core materials to flow through while effectively channeling the UV light out of the flow stream and into the transmission tunnels. One configuration provides a series of holes be located in the reflective surfaces in order to allow coolant flow while directing a percentage of the UV radiation into the transmission tunnel(s).

The UV light transmitted through the tunnels then strikes the surface of photovoltaic cells positioned exterior to the shield.

A second embodiment for the transmission method provides an array of photovoltaic cells mounted on the inner surface of an annulus which is installed along the inner walls of the reactor/converter cavity. The UV light generated in the converter is thereby directly incident on the photovoltaic cells, eliminating the necessity of focusing and transporting the light energy outside of the biological shield to the photovoltaic cells.

An energy conversion method is selected to obtain the maximum amount of electrical energy (direct current) from the UV radiation. An array of wide band gap (approximately 5 eV, capable of high power density operation) photovoltaic cells is provided to convert up to 80% of the transmitted UV radiation to electrical energy. The conversion efficiency can be increased by employing non-imaging optical concentration and alternative photovoltaic cells such as high damage threshold (up to 25 kW/cm2) synthetic diamond cells.

Figure 1B:
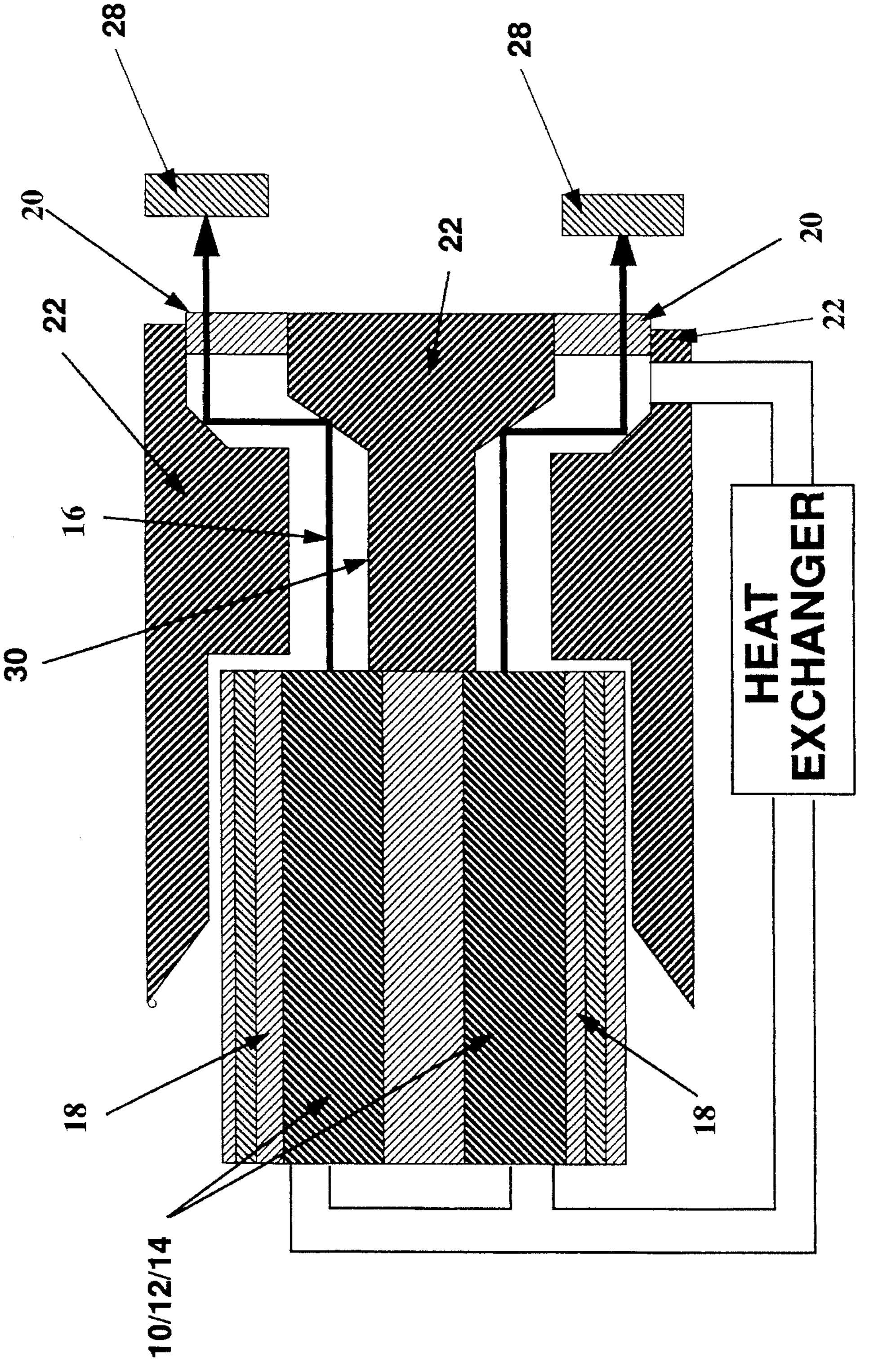

Referring now to FIGS. 1A and 1B., there is shown one embodiment of a nuclear driven electrical power source in conceptual form. Dissolved $UF_6$ 10 produces fission fragments, neutrons, and gammas 12 which interact with surrounding converter atoms 14. The $UF_6$ and noble element converter are insulated from the cavity walls 18 by an inert buffer. The fission fragments, neutrons, and gammas 12 excite the molecules in the converter and produce UV radiation 16. The UV radiation 16, is reflected by polished cavity walls 18 and focused onto the transmitting window 20. The focused UV radiation is channeled outside the biological shield 22 to a photovoltaic array 28 by a series of mirrors 24 mounted strategically in a transmitting tunnel 30.

As shown in FIGS. 1A and 1B, noble element converter 14 is selected to use the fission fragments, neutrons, and gamma-ray photons 12 produced by fissioning $UF_6$ 10 in the noble element converter 14. Both liquid and gaseous noble element converter may be considered. The nearly 300 times higher density of liquid permits full exploitation of the penetrating power of neutrons and gamma radiation. For example, Argon liquid density is 1.39 $gm/cm^3$, while gaseous density (at STP) is 5 $mg/cm^3$. The mean free path for neutrons and gammas is inversely proportional to the density. For low pressure gas, fission neutrons have ranges approaching 100 meters.

Dense converter media can be formed using a liquid host. A liquid selected from Group VIII of the periodic table of the elements (i.e., a noble "gas": He, Ne, Ar, Kr, Xe, or Rn) can be selected with a high cross section for (n, gamma) reactions at low neutron energies. These gammas are uniformly distributed throughout the dense converter media (since the neutron mean free path is approximately 30 centimeters) and produce a volumetrically distributed source of electrons with average energies ranging from 0.5 to 1.0 MeV primarily through Compton scattering (pair production and photoelectric effect contributions are fairly small). Additionally, high energy electrons are produced in the dense converter media by prompt fission gamma-ray photons, which also induce Compton scattering that contributes to light production in the system. The fission fragments similarly deposit their energy entirely within the volume as described previously.

The high energy electrons produced by the Compton process produce ion-pairs and excited states in the host material with approximately 50,000 ion-pairs per electron. The excited states decay through photon emission to generate incoherent UV radiation.

The incoherent UV radiation (approximately 3–5 eV) produced by the return of the noble elements to ground state is focused on an array of photovoltaic cells (i.e. Silicon, Si, P.V. cells). Wide band-gap photovoltaic cells are capable of accepting incident radiation having energy in the 5 eV range, and are suitable for high power density operation (up to 25 $W/cm^2$).

To further increase the efficiency of the photovoltaic array, high damage threshold ($P_L$>1 $kW/cm^2$) synthetic diamond photocells may be used. These cells improve the electrical conversion with intrinsic efficiencies as high as 80% while still accepting a band gap of approximately 5 eV.

Referring again to FIG. 1B, there is shown a means of transporting the UV radiation produced in the core/converter region 10 and 14 to the photocells for electrical energy production. In the embodiment illustrated in FIG. 1B, the UV radiation 16 is reflected by polished walls on the inner cavity 18 to a transmitting window 20. The focused UV light 16 is then piped through the biological shield 22 using reflective surfaces 24 built into a transmitting tunnel 30. The UV radiation strikes a photovoltaic array 28 where it is converted to electrical energy.

Figure 2A:
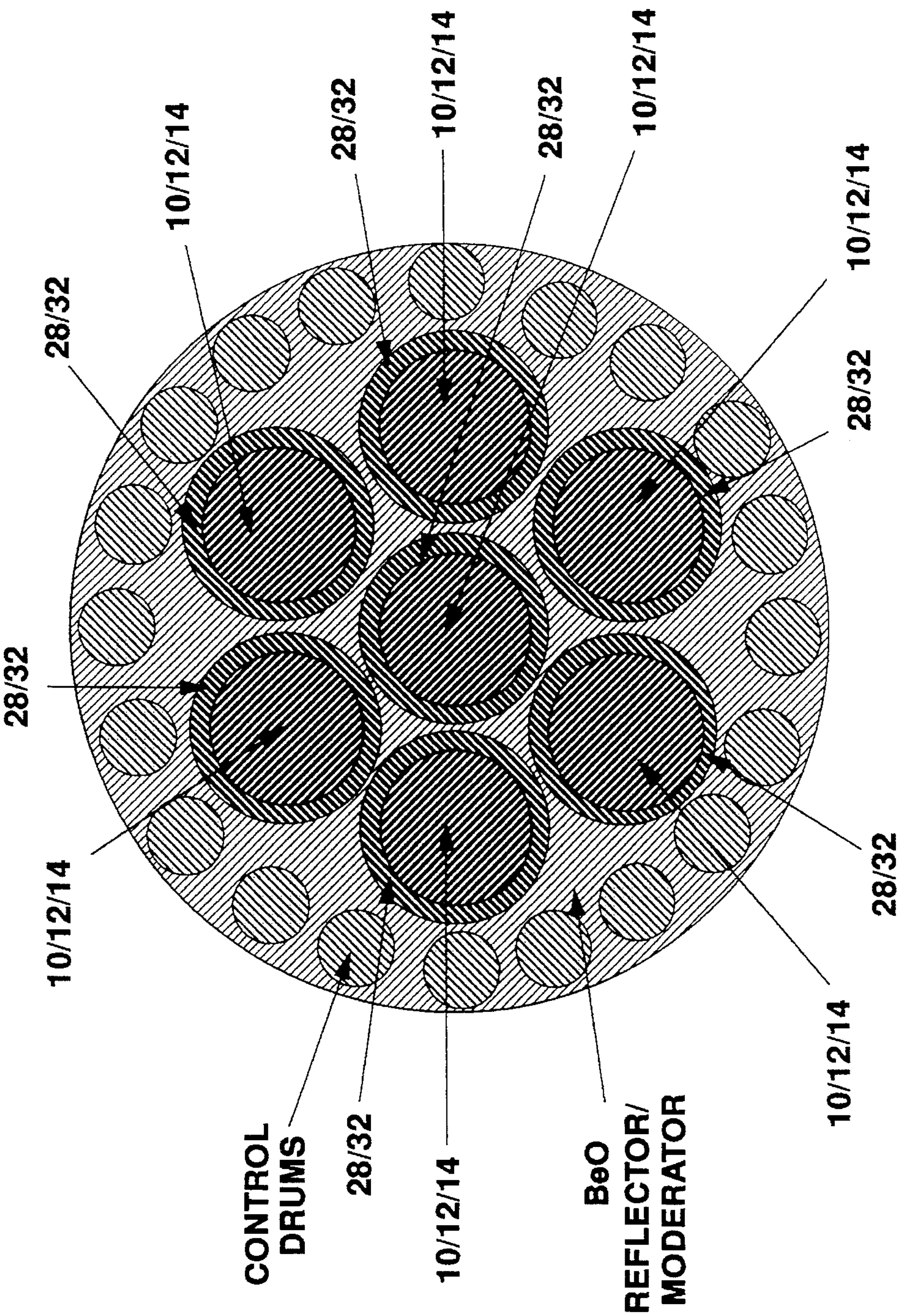
FIGS. 2A and 2B are representations, in cross section, of a compact fission driven electrical power source with adjacent photovoltaic array.
Figure 2B:
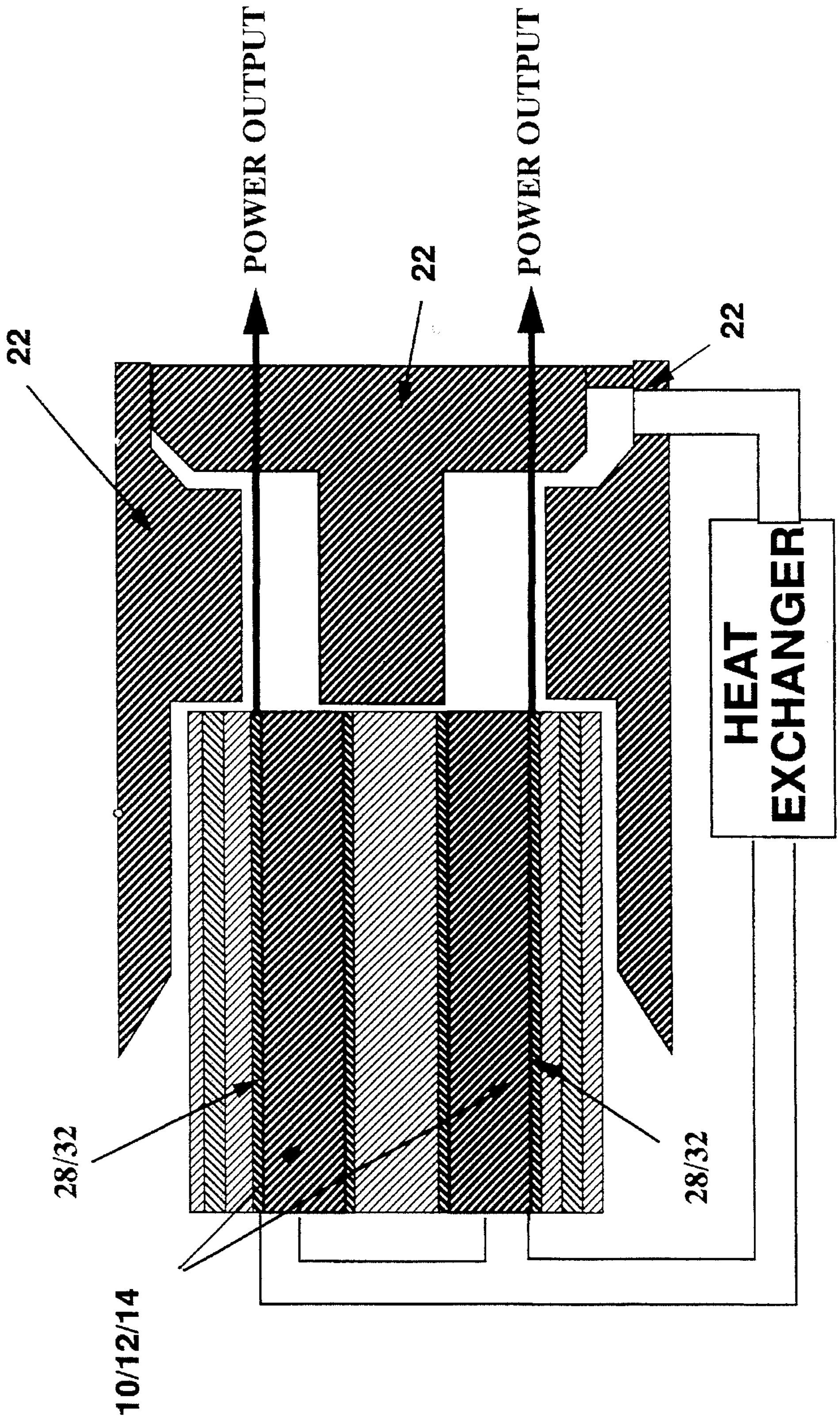

In another embodiment, illustrated in FIGS. 2A and 2B, photovoltaic cells are mounted on the inner surface of an annulus 32 which is installed along the walls of the reactor/converter cavity. The annulus is constructed such that it is replaceable at intervals should efficiency decrease due to radiation damage incurred over the life of the reactor. This configuration eliminates the necessity of focusing and transporting the UV radiation outside the core/converter region (10 and 14) by a light pipe 30. Use of the photovoltaic annulus increases the overall efficiency of the system by eliminating UV radiation losses suffered by focusing and transmitting the optical energy.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating incoherent UV radiation which is converted directly into electricity comprising:

a fission reactor for generating a steady flux of neutrons, gamma-ray photons, and fission fragments;

a dense noble gas converter medium arranged to receive said neutrons, gamma-ray photons, and fission fragments, said noble gas converter including a component selected from Group VI of the periodic table of the elements, having a high (n, gamma) cross section (>1 barn) at low (<1 eV) neutron energies, and generating ultraviolet wavelength radiation from interactions with gamma radiation produced by said (n,gamma) reactions, prompt fission gammas, and fission fragments through Compton scattering and ionization and excitation processes respectively; and an array of photovoltaic cells for converting said ultraviolet radiation into electrical energy.

2. Apparatus according to claim 1, wherein said fission reactor is a reactor with a dense fluidized core utilizing fissionable fuel in a noble element gas media at high pressure.

3. Apparatus according to claim 1, wherein said fission reactor is a reactor with a liquid core at either cryogenic temperatures or pressurized at room temperature.

4. Apparatus according to claim 1, wherein said fission reactor is a reactor with a liquid core pressurized at room temperature.

5. Apparatus according to claim 1, wherein said fission reactor is a reactor with air cooling provisions.

6. Apparatus according to claim 1, wherein said fission reactor is a reactor capable of steady-state operation.

7. Apparatus according to claim 1, wherein said converter medium is effective to utilize energy released in each fission event comprising neutron, gamma-ray photon, and fission fragment energy combined.

8. Apparatus according to claim 1, wherein said converter medium is selected to produce narrow band light radiation through ionization and excitation of the media directly by fission fragments, and by electrons produced by prompt or from n-gamma capture reactions from Compton scattering from gammas.

9. Apparatus according to claim 1, wherein said converter medium is selected to produce narrow band UV light radiation through ionization and excitation of the media by fission fragments, by neutron capture, by prompt fission gamma rays followed by Compton scattering and through use of wavelength-shifters said radiation can be narrow bandwidth visible light.

10. Apparatus according to claim 1, further including an optical system to transport said light radiation to said photovoltaic cells for production of electricity.

11. Apparatus according to claim 1, wherein said converter includes a laser with output radiation in the ultraviolet and visible spectra and optical resonators with one partially transmitting mirror.

12. Apparatus according to claim 1, further including means for supporting said photovoltaic cells apart from said reactor and converter regions and optical means for transmitting said light from said reactor core to said photovoltaic cells.

13. Apparatus according to claim 1, further including means for supporting said photovoltaic cells circumferentially about said fission reactor and converter and optical means for transmitting said light radiation from said fission reactor and converter to said photovoltaic cells.

* * * * *